US012577978B2

(12) United States Patent
Yang et al.

(10) Patent No.: US 12,577,978 B2
(45) Date of Patent: Mar. 17, 2026

(54) HINGE ASSEMBLY

(71) Applicant: CURELIFE CO., LTD., Siheung-si (KR)

(72) Inventors: Doo Young Yang, Siheung-si (KR); Hye Jung Yang, Siheung-si (KR)

(73) Assignee: CURELIFE CO., LTD., Siheung-si (KR)

( * ) Notice: Subject to any disclaimer, the term of this patent is extended or adjusted under 35 U.S.C. 154(b) by 0 days.

(21) Appl. No.: 18/021,530

(22) PCT Filed: Aug. 10, 2022

(86) PCT No.: PCT/KR2022/011934
§ 371 (c)(1),
(2) Date: Jun. 23, 2025

(87) PCT Pub. No.: WO2023/128114
PCT Pub. Date: Jul. 6, 2023

(65) Prior Publication Data
US 2025/0341230 A1 Nov. 6, 2025

(30) Foreign Application Priority Data
Dec. 27, 2021 (KR) ........................ 10-2021-0188398

(51) Int. Cl.
*F16C 11/04* (2006.01)
*F16C 11/10* (2006.01)
*E05D 11/10* (2006.01)
(52) U.S. Cl.
CPC ........... *F16C 11/04* (2013.01); *F16C 11/103* (2013.01); *E05D 11/10* (2013.01); *E05Y 2900/20* (2013.01); *Y10T 403/32327* (2015.01)

(58) Field of Classification Search
CPC ................... F16C 11/10; F16C 11/103; Y10T 403/32327; Y10T 403/32361; Y10T 403/32557
See application file for complete search history.

(56) References Cited

U.S. PATENT DOCUMENTS 249,627 A * 11/1881 Hughes .................. F16M 11/04
403/326
3,352,580 A 11/1967 Kurz et al.
(Continued)

FOREIGN PATENT DOCUMENTS

CN 209404831 U 9/2019
CN 211969652 U 11/2020
(Continued)

*Primary Examiner* — Michael P Ferguson
(74) *Attorney, Agent, or Firm* — Maschoff Brennan

(57) ABSTRACT

The present invention relates to an improved hinge assembly, and more particularly, which consists of a hinge rotation body and a hinge support body, so that the hinge rotation body and the hinge support body are easily rotated to each other by hinge rotation and, in addition, the hinge rotation body and the hinge support body are easily returned to their original positions by an operation to push any one of the hinge rotation body and the hinge support body after hinge rotation to thus significantly improve convenience as well as usability. Further, since the above components are locked or unlocked based on the left and right seesaw movement due to displacement of center of gravity of the locking member, a simple configuration may be adopted to greatly improve productivity as well as assembly efficiency and reduce production cost.

4 Claims, 8 Drawing Sheets

(56) References Cited

U.S. PATENT DOCUMENTS

| | | | | |
|---|---|---|---|---|
| 3,593,952 A * | 7/1971 | Smith | .................... | A61N 5/01 |
| | | | | 248/214 |
| 4,890,950 A * | 1/1990 | Yoo | ...................... | F16C 11/10 |
| | | | | 182/163 |
| 5,031,606 A | 7/1991 | Ring, Sr. | | |
| 5,334,354 A * | 8/1994 | Johnston | ................... | B01L 9/50 |
| | | | | 16/376 |
| 5,353,892 A * | 10/1994 | Lu | ............................ | E06C 1/39 |
| | | | | 182/27 |
| 6,711,780 B2 * | 3/2004 | Lee | .......................... | E06C 1/32 |
| | | | | 16/334 |
| 11,484,129 B2 * | 11/2022 | Zhang | ................... | A47D 1/004 |

FOREIGN PATENT DOCUMENTS

| | | | | |
|---|---|---|---|---|
| JP | 2011224033 A | 11/2011 | | |
| JP | 2013081632 A | 5/2013 | | |
| KR | 20-0322624 | 8/2003 | | |
| KR | 20-0358061 | 8/2004 | | |
| KR | 2020110003409 U | 4/2011 | | |
| KR | 101221090 B1 | 2/2013 | | |
| KR | 101255988 B1 | 4/2013 | | |
| KR | 1020140035188 A | 3/2014 | | |
| WO | 0021784 A1 | 4/2000 | | |
| WO | WO-2004/052710 A1 * | 6/2004 | ............. | F16C 11/10 |

* cited by examiner

HINGE ASSEMBLY

FIELD OF INVENTION

The present invention relates to an improved hinge assembly, and more particularly, which consists of a hinge rotation body and a hinge support body, so that the hinge rotation body and the hinge support body are easily rotated to each other by hinge rotation and, in addition, the hinge rotation body and the hinge support body are easily returned to their original positions by an operation to push any one of the hinge rotation body and the hinge support body after hinge rotation.

BACKGROUND OF INVENTION

In general, a hinge device has a fixed body and a rotary body with hinge-rotation about the fixed body as an axis to support an object to be supported ("support object"), wherein the device is folded to move or store the support object. Such a hinge device includes, for example, dining tables, chairs, tables, desks, outdoor tables, foldable work tables, portable work tables, and the like, as well as foldable leg-mounted ironing boards, foldable clothes hangers, wall-mounting foldable tables, wall-mounting foldable beds, legs of portable news stand tables, portable tables, prefabricated exercise equipment, foldable product display stands, sinks, or doors of decorative cabinets, support means for bicycle or kickboard, folding means to unfold or fold the length of push rods of a bloom, folding means for automobile seats, or the like, which are being used in various applications.

For example, according to the folding device of a folding mechanism disclosed in Korean Utility Model Registration No. 20-0322624, is provided a folding structure in which one or more folding actuators are attached to a single fixture to execute folding operation at a right angle, wherein the one or more folding actuators rotatably moving at a right angle in one direction are mounted on the fixture and are connected to a support piece provided with a locking jaw protruding to one side through a coupling pin; and the folding mechanism is folded or unfolded at one side of the folding actuator by a locking regulator that is engaged to and released from the locking jaw of the support piece at a right angle, so that a spring is compressed to compress an elastic restoration body when the folding mechanism is folded, and then, the compressed elastic restoration body is returned to its original position to facilitate unfolding of the folding mechanism.

As another example, according to a foldable bicycle equipped with an auxiliary steering device disclosed in Korean Utility Model Registration No. 20-0358061, the foldable bicycle is provided with the auxiliary steering device, the auxiliary steering device comprising: an operation bar which is installed at the rear of the foldable bicycle and rotates by the operation of a handle; a first operation link which is connected to the operation bar though a connection plate and moves horizontally along the rotation of the operation bar; and a second operation link which is connected to the first operation link by a spring and moves forward and backward according to the operation of the first operation link to rotate a steering shaft and thus manipulate a direction of a front wheel of the bicycle, and wherein the auxiliary steering device is configured to be foldable whereby convenient storage can be expected. That is, the auxiliary steering device is folded and unfolded through elasticity of the spring so as to ensure storage and improve space utilization.

However, these conventional techniques have a problem in that the configuration is complicated and the assembling time is extended to cause reduction in assembly efficiency and productivity.

Further, there is a problem in that many components are required, which leads to an increase in production cost, and thus has a burden on the purchase cost or installation cost. Accordingly, it is urgently required for development of technologies that can increase assembly efficiency and productivity with a simple configuration, reduce the cost burden, firmly support a support object, and allow a rotation body to be easily folded and unfolded with respect to a fixed body.

Prior Art Literature

Patent Document 1: Korean Utility Model Registration No. 20-0322624 (Registered on Jul. 30, 2003)
Patent Document 2: Korean Utility Model Registration No. 20-0358061 (Registered on Jul. 27, 2004)

Technical Problem

An object of the present invention is to provide an improved hinge assembly consisting of a hinge rotation body and a hinge support body in order to facilitate hinge rotation, in which the hinge rotation body and the hinge support body are fixed by a locking operation in the rotated state, and the locking of the hinge rotation body and the hinge support body is released to return the same to their original positions by an operation of further pushing any one of the hinge rotation body and the hinge support body.

As a means for achieving the above object, the improved hinge assembly according to the present invention may comprise a hinge rotation body, a hinge support body hinge-connected (or hinged) to the hinge rotation body, and a locking member provided in the hinge rotation body, wherein: when the hinge rotation body is hinge-rotated toward the hinge support body side, one side of the locking member is pressed while the other side thereof is lifted so that the hinge-rotated hinge rotation body and the hinge support body are locked together while maintaining the rotated state; if pulling the hinge support body from the hinge rotation body in a state that the hinge rotation body and the hinge support body are locked together, the locking of the locking member is released; and, when the locking is released, the hinge rotation body is unfolded from the hinge support body so as to return the hinge rotation body to its original position.

DETAILED DESCRIPTION OF PREFERRED EMBODIMENTS OF INVENTION

Figure 1:
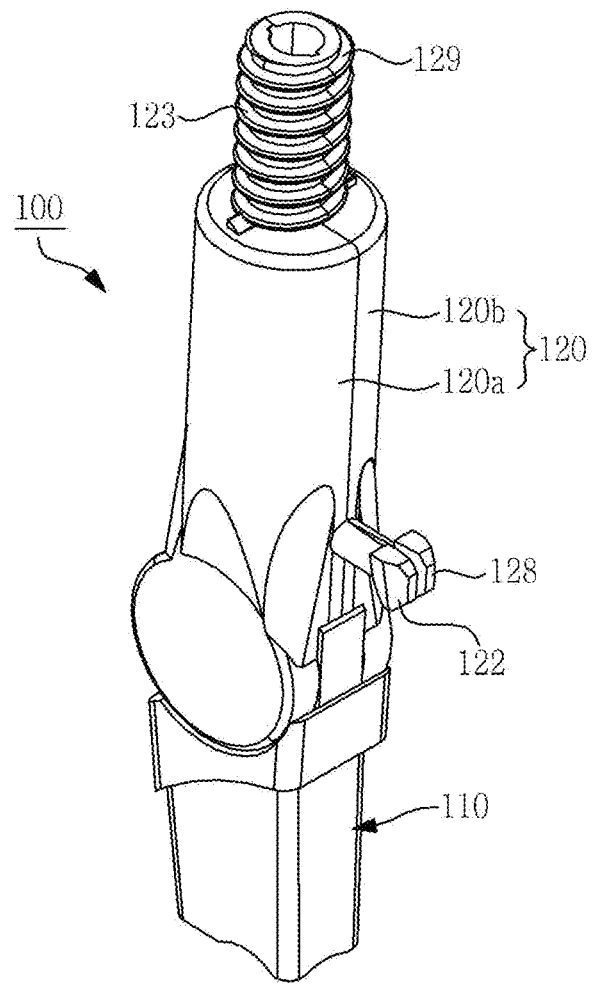
FIG. 1 is a perspective view showing an improved hinge assembly according to the present invention.
Figure 2:
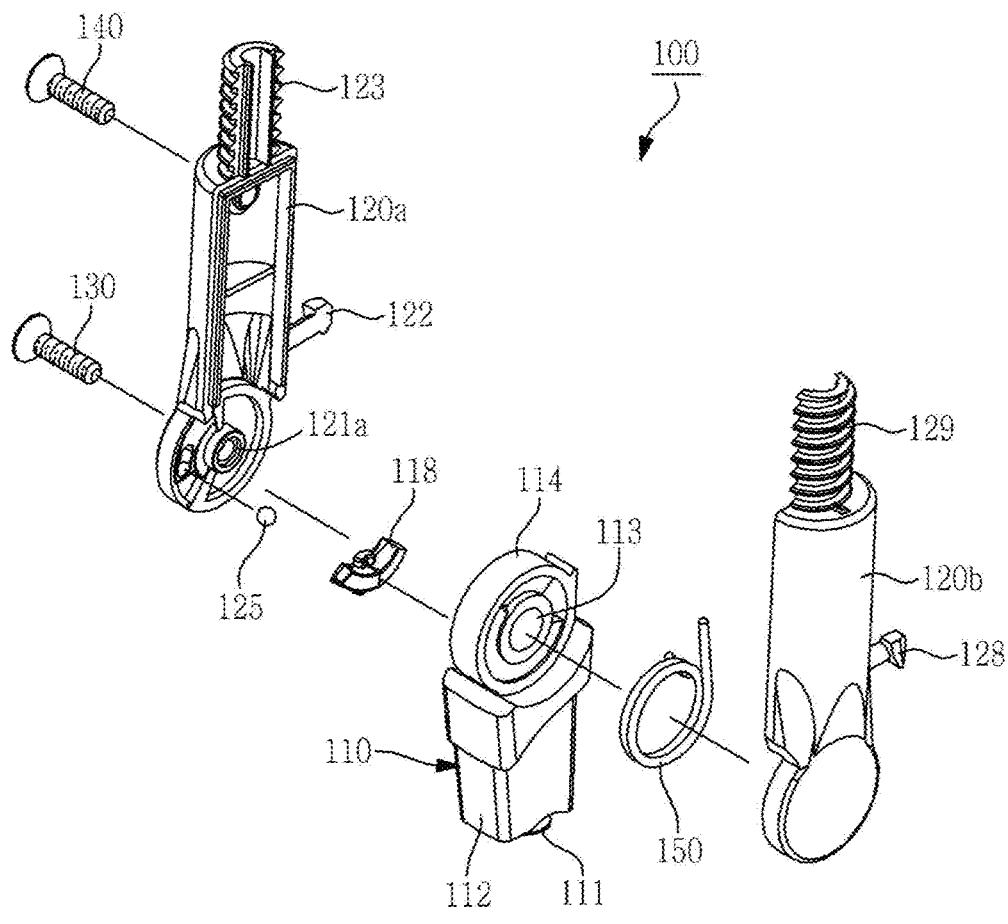
FIG. 2 is an exploded perspective view showing the configuration of the improved hinge assembly according to the present invention.
Figure 3:
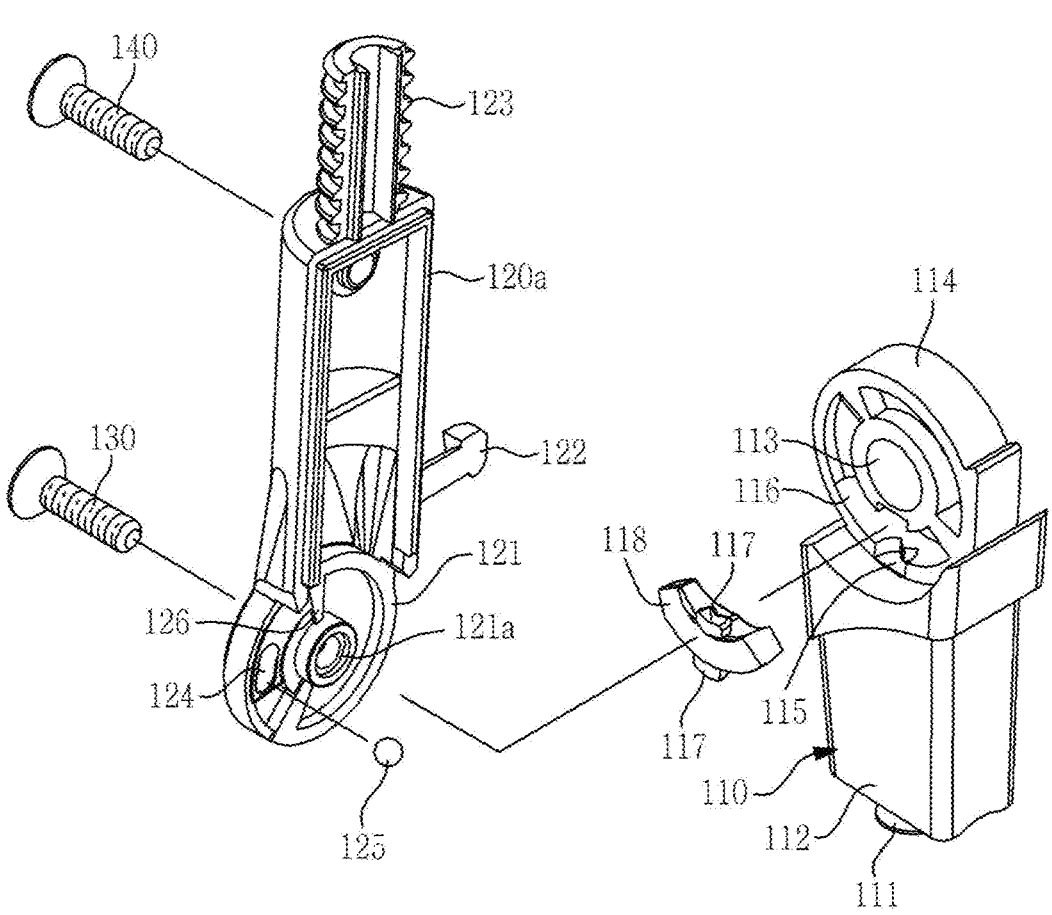
FIG. 3 is an exploded perspective view of one side showing the configuration of the improved hinge assembly according to the present invention.
Figure 4:
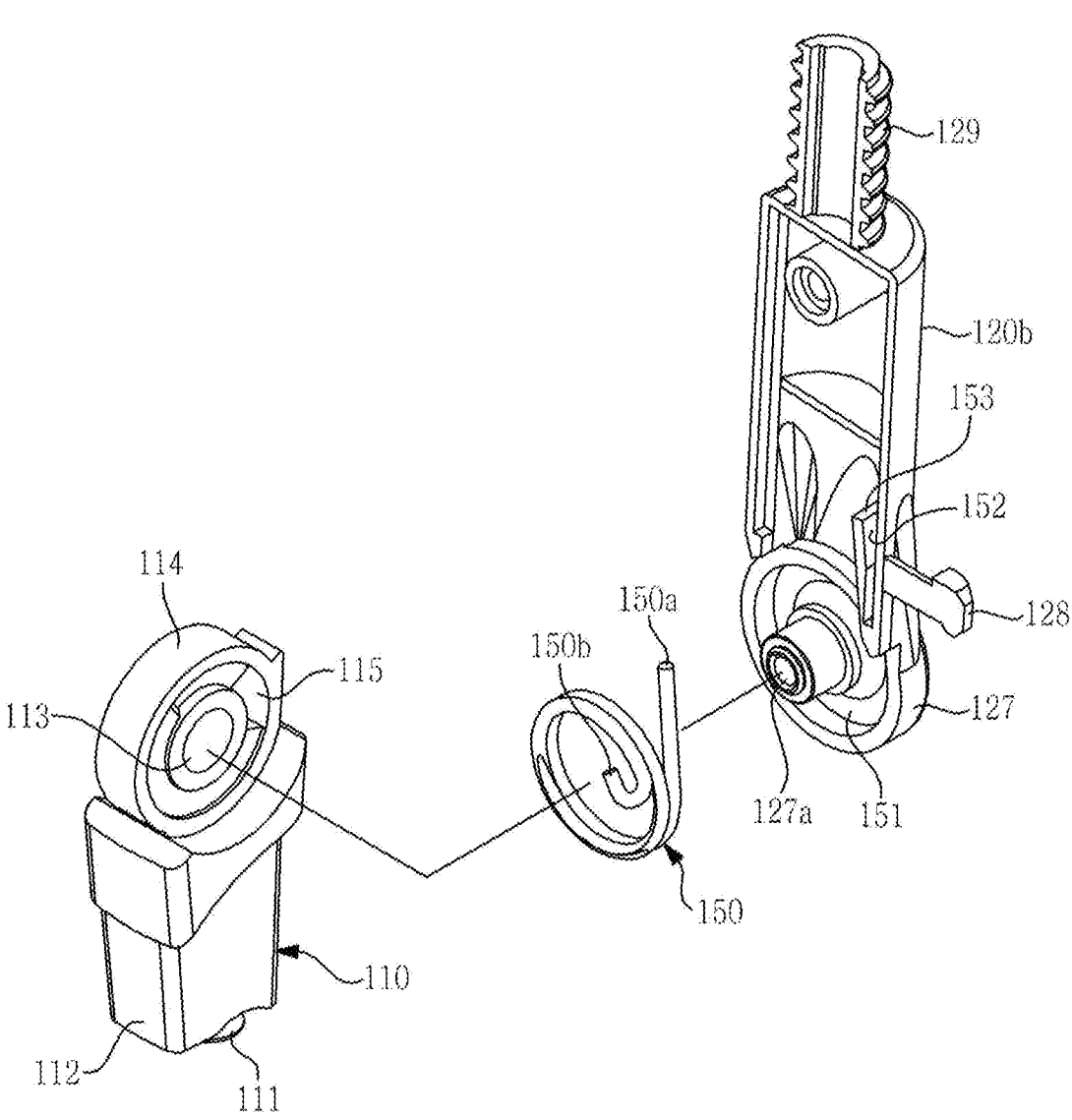
FIG. 4 is an exploded perspective view of the other side showing the configuration of the improved hinge assembly according to the present invention.

Hereinafter, in addition to the above object, other objects and features of the present invention will become apparent through the description of embodiments with reference to the accompanying drawings.

Unless defined otherwise, all terms used herein including technical or scientific terms have the same meanings as commonly understood by one of ordinary skill in the art to which this invention pertains (referred to as "those skilled in the art"). Terms such as those defined in commonly used dictionaries should be interpreted as having the meanings consistent with the meanings in the context of the related art, and should not be interpreted in ideal or excessively formal meanings unless explicitly defined in the present application.

Hereinafter, an improved hinge assembly according to an embodiment of the present invention will be described in more detail with reference to the accompanying drawings.

As shown in the drawings, the present invention relates to a hinge assembly 100 that includes a hinge rotation body 110, a hinge support body 120 hinged to the hinge rotation body 110, and a locking member 118 provided in the hinge rotation body 110. In the hinge assembly of the present invention, when the hinge rotation body 110 is hinge-rotated toward the hinge support body 120, one side of the locking member 118 may be pressed while the other side thereof is lifted so that the (hinge-rotated) hinge rotation body 110 and the hinge support body 120 are locked together to maintain the rotated state.

Figure 5:
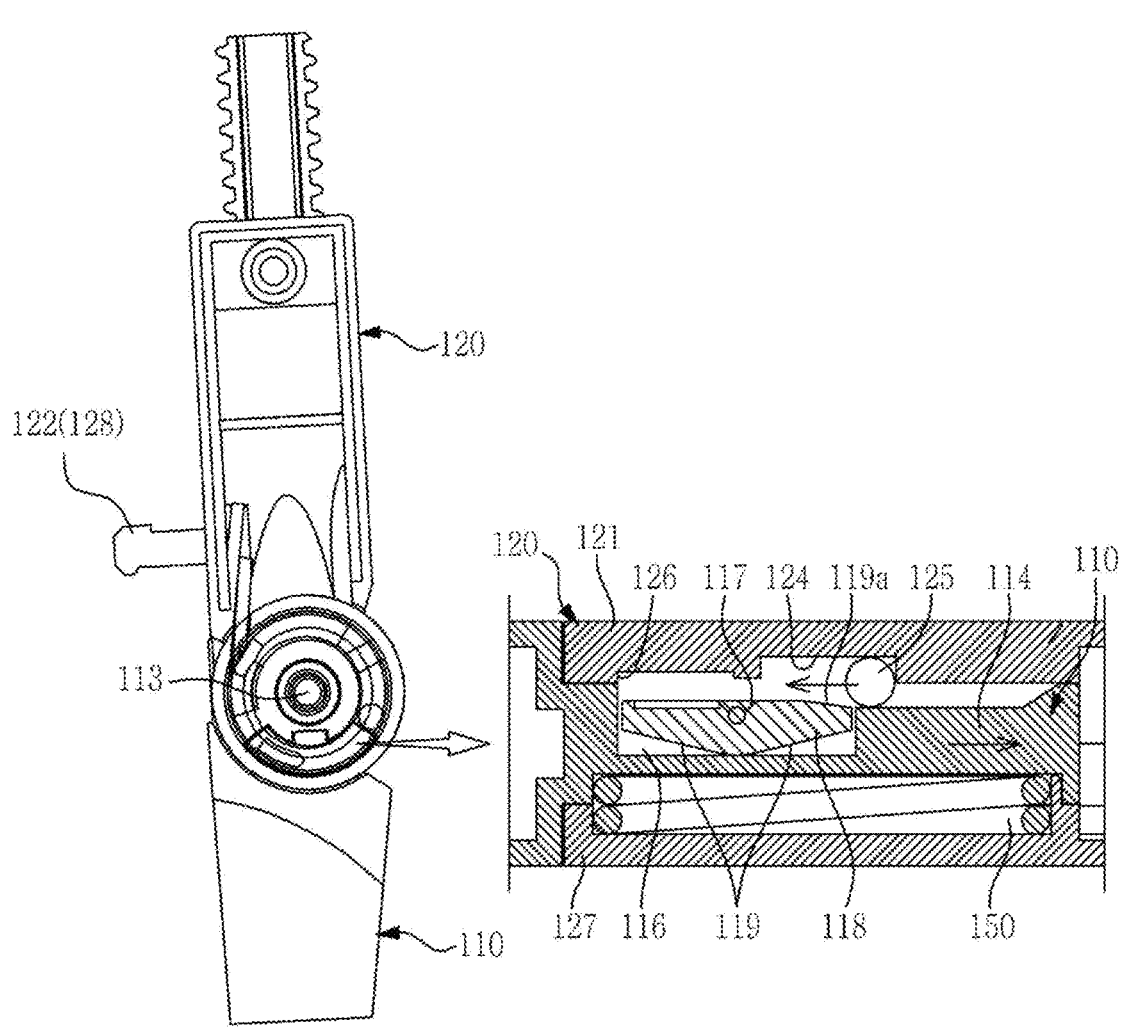
FIGS. 5 to 8 are operational block diagrams illustrating the hinge motion and the locking and unlocking states of the improved hinge assembly according to the present invention, respectively.
Figure 6:
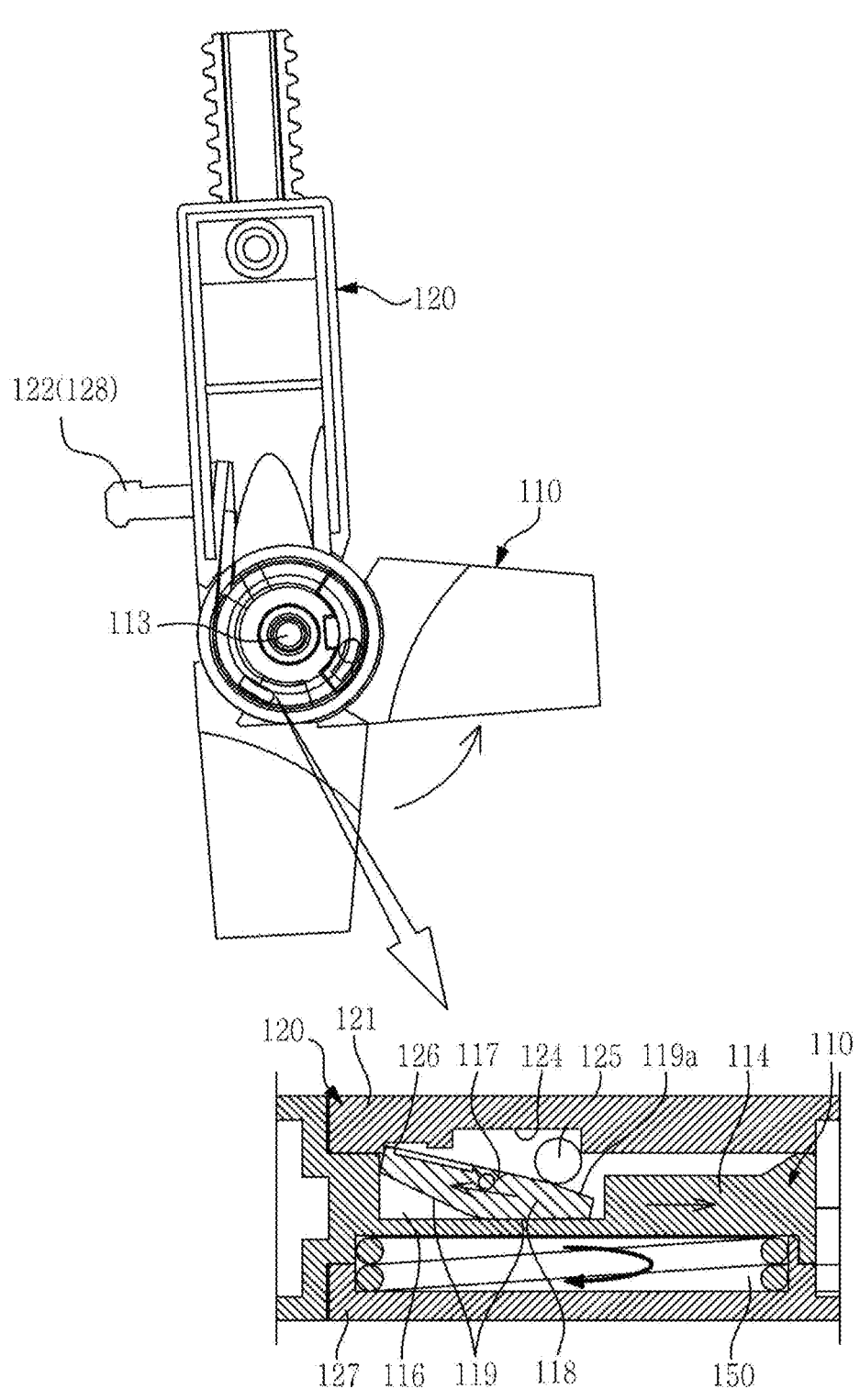

Further, when the hinge support body 120 is pulled from the hinge rotation body 110 in a state where the hinge rotation body 110 and the hinge support body 120 are locked together, the locking of the locking member 118 may be released (that is, the locking member 118 may be unlocked). Subsequently, when the locking is released as described above, the hinge rotation body 110 may be unfolded from the hinge support 120 and thus be returned to its original position. According to the present invention configured in this way, as shown in FIG. 5, the hinge rotation body 110 and the hinge support body 120 may maintain a state perpendicular to each other at an angle of 180 degrees when the hinge rotation body 110 is unfolded from the hinge support body 120. Further, as shown in FIG. 6, when the hinge rotation body 110 is hinge-rotated toward the hinge support body 120, the hinge rotation body 110 and the hinge support body 120 may be folded at an angle of 90 degrees so that the hinge rotation body 110 is positioned in a horizontal direction to a vertical direction of the hinge support body 120. In addition, when the hinge rotation body 110 is positioned in the horizontal direction to the vertical direction of the hinge support body 120, the horizontally positioned hinge rotation body 110 may be fixed by the locking member 118, as shown in FIG. 6.

Figure 7:
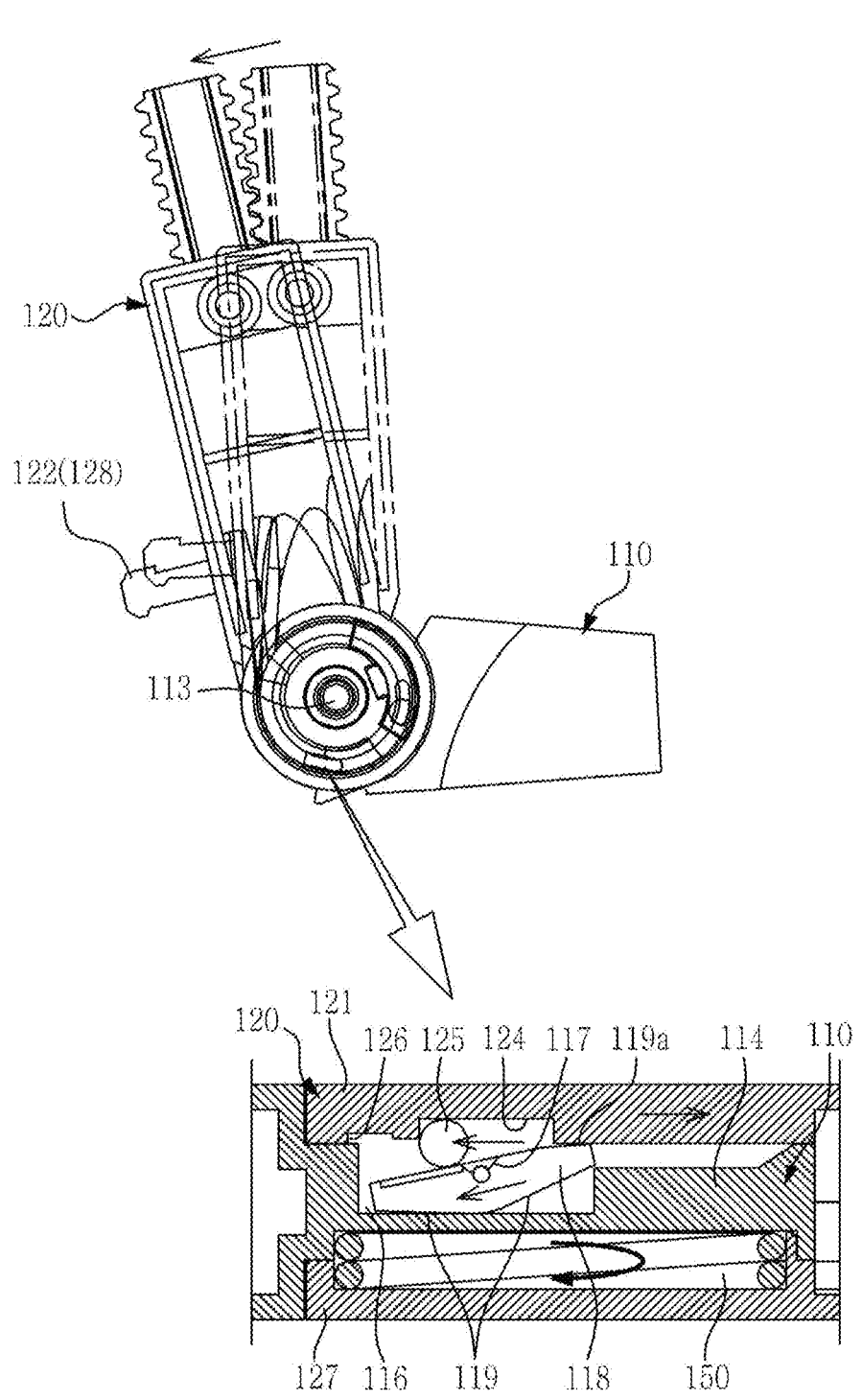

Then, if the hinge support body 120 in the vertical direction is further tilted from the hinge rotation body 110 in a state that the hinge rotation body 110 is fixed in the horizontal direction, the locking member 118 is unlocked as shown in FIG. 7. At this time, if unfolding the hinge rotation body 110 in the opposite direction to a direction of folding the hinge rotation body 110 toward the hinge support body 120, both the hinge rotation body 110 and the hinge support body 120 may become unfolded. To this end, the hinge rotation body 110 of the present invention may include: a connection member 112 having a bolt connection part 111 provided at a lower end thereof; a rotary hinge member 114 that integrally extends from an upper end of the connection member 112 and is provided with a hinge shaft hole 113 at the inner center thereof; a locking member receiving part 116 that is provided on one surface of the rotary hinge member 114 and has support grooves 115 at both ends thereof, wherein the locking member 118 is received in the locking member receiving part 116, locking member shafts 117 seated in the support grooves 115 are provided at both ends of the locking member 118, and the locking member 118 is provided to implement seesaw movement in left and right directions by the locking member shafts 117. Further, on a lower surface of the locking member 118, there is provided a seesaw guide surface 119 up-inclined toward an upper surface of the locking member 118 in both directions around the locking member shafts 117 provided at both ends of the locking member 118, so as to facilitate the seesaw movement of the locking member 118. Further, the hinge support body 120 may include a first hinge support member 120a and a second hinge support member 120b, which are positioned to face each other, bolt-coupled, and hinged to both sides of the rotary hinge member 114 in the hinge rotation body 110, respectively. The first hinge support member 120a may include: a first rotary support part 121 which is in close contact with one surface of the rotary hinge member 114 in the hinge rotation body 110 and has a first rotary support hole 121a positioned to correspond to one side of the hinge shaft hole 113; a first hook 122 extending from an outer surface of the first rotary support part 121; a first semi-helical part 123 which is provided at the end of the first hinge support member 120a and is spirally-coupled to the support object; a locking ball receiving guide 124 which is provided inside the first rotary support part 121 and is formed of a long groove; a locking ball 125, which is received in the locking ball receiving guide 124, is moved to the locking member 118 when the hinge rotation body 110 is hinge-rotated and folded toward the hinge support body 120, followed by pressing one side of the locking member 118 to lift (or raise) the other side of the locking member 118 to thus allow locking, and which is moved toward the other side of the locking member 118 when the hinge rotation body 110 is further pushed toward the hinge support body 120 and further folded toward the hinge support body 120, followed by pressing the lifted other side of the locking member 118 to thus allow unlocking (or release the locking); and a locking jaw 126, in which, when the other side of the locking member 118 is lifted by pressing the one side thereof by the locking ball 125, the lifted other side of the locking member 118 is locked thereon. On the other hand, the second hinge support member 120b may include: a second rotary support part 127 which is in close contact with the other surface of the rotary hinge member 114 in the hinge rotation body 110 and has a second rotary support hole 127a positioned to correspond to the other side of the hinge shaft hole 113; a second hook 128 extending from an outer surface of the secondrotary support part 127 and being in close contact with the first hook 122 of the first hinge support member 120b; and a second semi-helical part 129 which is provided at the end of the second hinge support member 120b, is in close contact with the first semi-helical part 123, and is spirally-coupled to the support object. Further, the hinge shaft hole 113 of the hinge rotation body 110, another hinge shaft hole 113 to connect the first rotary support hole 121a of the first hinge support member 120a and the second rotary support hole 127a of the second rotary support member 120b, and a coupling bolt 140 to fasten and fix the first hinge support member 120a and the second hinge support member 120b, may also be provided. At this time, the first hinge support member 120*a* and the second hinge support member 120*b* in the hinge support body 120 may be provided symmetrically with respect to each other wherein the first hinge support member 120*a* and the second hinge support member 120*b* may be fastened by the coupling bolt 140 to be fastened in a state that the first rotary support part 121 of the first hinge support member 120*a* is in close contact with one surface of the rotary hinge member 114 of the hinge rotation body 110 while the second rotary support part 127 of the second hinge support member 120*b* is in close contact with the other surface of the rotary hinge member 114 of the hinge rotation body 110.

The locking member 118 is, as shown in FIGS. 5 to 8, is provided to implement seesaw movement in both directions, that is, in left and right direction around the locking member shaft 117 inside the locking member receiving part 116. More particularly, as shown in FIG. 6, when the right side of the locking member 118 is pressed around the locking member shaft 117, the left side of the locking member 118 may be lifted. As shown in FIG. 7, when the right side of the locking member 118 is pressed, the left side of the locking member 118 may be lifted. As such, the reason why the seesaw movement of the locking member 118 is possible may be as follows: that is, the locking member shafts 117 provided at both ends of the locking member 118 are inserted and seated in the support grooves 115 provided at both ends of the locking member receiving part 116, respectively, therefore, the locking member 118 may ascend or descend in the left and right directions shown in the drawing around the locking member shafts 117 as the center portion, thereby enabling the above seesaw movement. At this time, the above movement of the locking ball 125 is possible because the hinge support body 120 and the hinge rotation body 110 to configure the hinge assembly 100 are hinge-rotated to each other. Further, since the seesaw guide surface 119 is provided on the lower surface of the locking member 118, the seesaw guide surface 119 is located while being lifted upward in the inner space of the locking member receiving part 116. As a result, the seesaw guide surfaces 119 provided on both sides around the locking member shaft 117, respectively, may descend or ascend in light or right direction in a state where the center of the lower surface of the locking member 118 is in contact with the bottom of the locking member receiving part 116, thereby easily performing the seesaw movement of the locking member 118. Further, there is provided a down-inclined movement guide surface 119*a* at one side of the upper surface of the locking member 118 in order to facilitate movement of the locking ball 125 toward the locking member 118. Since the movement guide surface 119*a* is provided to be inclined downward as shown in the drawing, it is possible to prevent the locking ball 125 from being locked at one end of the locking member 118 when the locking ball 125 moves in the right direction of the locking member 118. Therefore, it is easy that the locking ball 12 moves in the right direction of the locking member 118 and presses the right side of the locking member 118.

Figure 8:
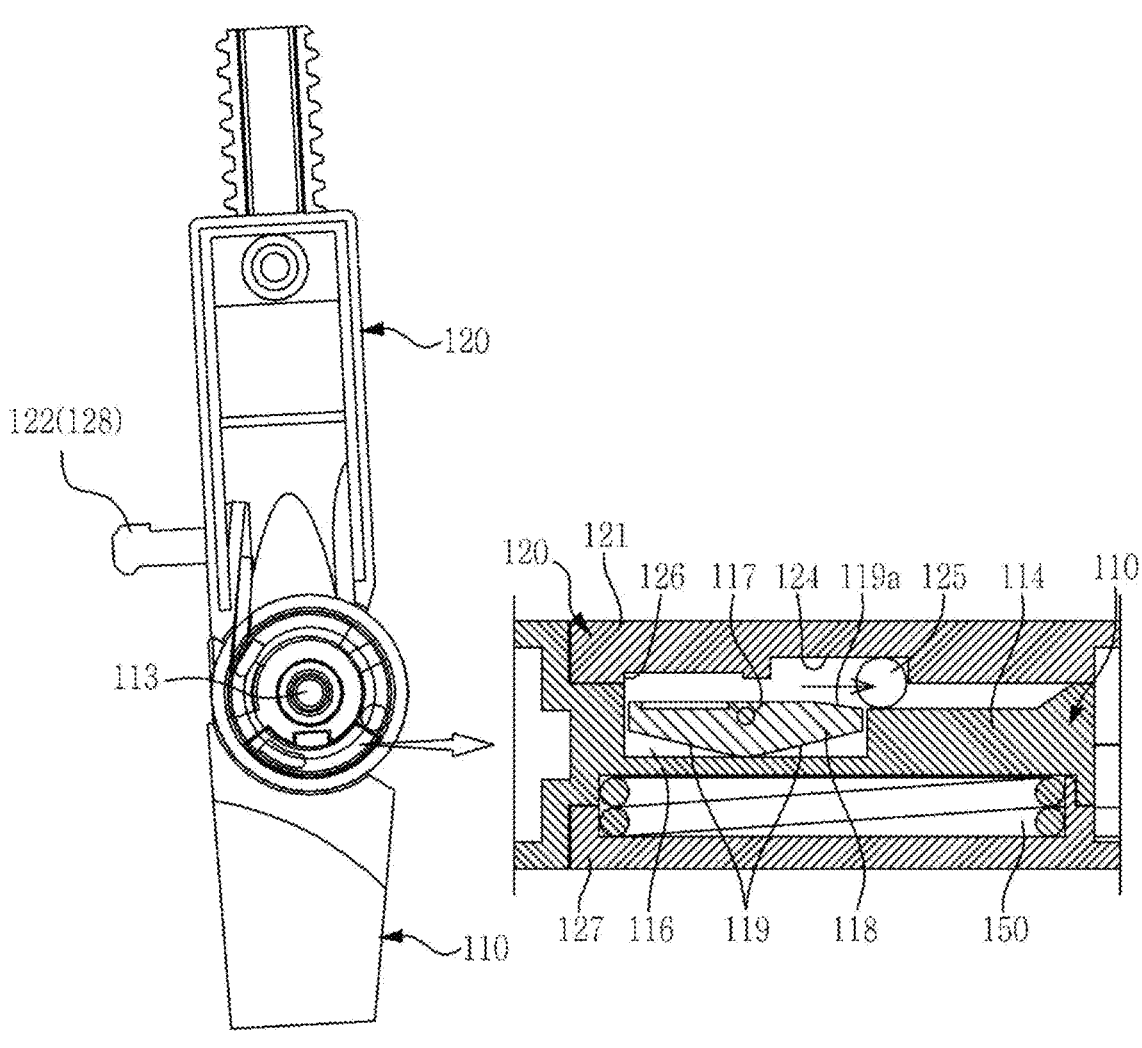

According to the present invention configured in this way, as shown in FIG. 5, when the hinge rotation body 110 is positioned in a state perpendicular to the hinge support body 120, the locking ball 125 may be positioned away from the locking member 118. As such, in a state where the locking ball 125 is out of the locking member 118, when the hinge rotation body 110 is hinge-rotated around the hinge shaft hole 113 as a rotational axis and then folded toward the hinge support body 120 as shown in FIG. 6, a position of the first rotation support part 121 of the first hinge support member 120*a* may be moved in the opposite direction of the rotated hinge rotation body 110; the locking ball 125 may move in the right direction of the locking member 118 due to rotation of the first rotation support part 121 so that the locking ball 125 is positioned on the upper end of the locking member 118; and the right side of the locking member 118 may be pressed by a load of the locking ball 125 located in the right direction of the locking member 118. Further, when the right side of the locking member 118 is pressed as the load of the locking ball 125 is transferred due to the movement of the locking ball 125, the left side of the locking ball 118 may be lifted around the locking member shaft 117; subsequently, the lifted left side of the locking member 118 may be locked on the locking jaw 126 of the first rotation support part 121. As such, when the left side of the locking member 118 is lifted and locked on the locking jaw 126, locking is made so that the hinge rotation body 110 positioned horizontally with respect to a vertical direction of the hinge support by 120 may be locked and fixed. Further, as shown in FIG. 7, when the hinge support body 120 is tilted backward with respect to the hinge rotation body 110, the locking ball 125 located on the right side of the locking member 118 may move in the left direction of the locking member 118 and press the left side of the locking member 118. At this time, since the left side of the locking member 118 is pressed while the right side of the locking member 118 is lifted, the left locking of the locking member 118 may be released from the locking jaw 126. Further, when the horizontally positioned hinge rotation body 110 is pulled away from the hinge support body 120 in state the locking member 118 is unlocked from the locking jaw 126, the hinge rotation body 110 and the hinge support body 120 may be located in the vertical direction to each other as shown in FIG. 8, so that the hinge rotation body 110 and the hinge support body 120 are vertically positioned.

At this time, since a locking ball receiving guide 124 in which the locking ball 125 is accommodated may be formed of a long groove as shown in the drawing, the locking ball 125 may move at a predetermined interval inside the locking ball receiving guide 124. Therefore, the locking ball 125 moves toward the other side of the locking member 118 and the other side of the locking member 118 is pressed by the load of the locking ball 125, so that the locking on the locking jaw 126 can be easily released. Further, inside the second hinge support member 120*b* of the hinge support body 120, a return body receiving part 151 and a return body fitting groove 152 extending toward an upper side of the return body receiving part 151 may be provided, and a return body support protrusion 153 may be provided at one side of the return body fitting groove 152. Further, there is provided an elastic return body 150 which is accommodated in the return body receiving part 151 and is in close contact with the other surface of the rotary hinge member 114 in the hinge rotation body 110, wherein one end 150*a* of the elastic body 150 is fitted and hooked in the return body fitting groove 152, and then, the one end 150*a* is supported by the return body support protrusion 153. Further, a return body locking groove 154 on which the other end 150*b* of the elastic return body 150 is locked may be provided on the other surface of the rotary hinge member 114 in the hinge rotation body 110. The elastic return body 150 is of course not limited, and it is preferable to adopt the configuration of a spring such as a coil spring or distorting spring that enables the hinge rotation body 110 to be quickly unfolded by self-elastic force when the hinge rotation body 110 is rotated and folded with respect to the hinge support body 120 and then the hinge rotation body 110 is unfolded from the hinge support body 120. As such, since the elastic return body 150 is provided, the elastic return body 150 may be compressed when the hinge rotation body 110 is rotated and folded with respect to the hinge support body 120. Subsequently, when the hinge rotation body 110 is unfolded from the hinge support body 120, unfolding operation of the hinge rotation body 110 can be rapidly performed by an elastic return force of the compressed elastic return body 150. Therefore, the locking ball 125 is moved toward the other side of the locking member 118, is unlocked by pressing the other side of the locking member 118, and may rapidly move in one side direction of the locking member 118, that is, in the right direction in the drawing, so that the hinge rotation body 110 can be quickly unfolded from the hinge support body 120, thereby enabling the locking to be rapidly released.

As described above, the present invention has described specific matters such as concrete components, etc., by means of restricted embodiments and drawings. However, these are only provided to assist more overall understanding of the present invention, and the present invention is not limited to the above embodiments. Various modifications and variations are possible from the above description by those skilled in the art to which the present invention pertains. Accordingly, the spirit of the present invention should not be limited to the described embodiments, instead, not only the claims described below but also all equivalents of the claims or equivalent modifications thereof will fall within the scope of the spirit of the present invention.

EFFECTS OF INVENTION

According to the present invention, the hinge rotation body and the hinge support body are hinged to each other, and the hinge rotation body is provided with a locking member, wherein: when the hinge rotation body and the hinge support body are hinge-rotated, the locking member locks the hinge-rotated hinge rotation body and the hinge support body together to thus secure the rotated state while having a seesaw motion in left and right directions; and, when pulling the hinge support body from the hinge rotation body, the locking is released and the hinge rotation body is unfolded from the hinge support body, so as to connect the hinge rotation body to a rotating object while connecting the hinge support body to a support object, whereby the rotating object may be hinge-rotated and fixed toward the support object or may be returned to its original position to thus significantly improve convenience as well as usability. Further, since the above components are locked or unlocked based on the left and right seesaw movement due to displacement of center of gravity of the locking member, a simple configuration may be adopted to greatly improve productivity as well as assembly efficiency and reduce production cost.

The invention claimed is:

1. A hinge assembly (100), comprising:
a hinge rotation body (110), a hinge support body (120) hinge-connected to the hinge rotation body 110, and a locking member (118) provided in the hinge rotation body (110), wherein:
when the hinge rotation body (110) is hinge-rotated toward the hinge support body (120) side, one side of the locking member (118) is pressed while the other side thereof is lifted so that the hinge-rotated hinge rotation body (110) and the hinge support body (120) are locked together while maintaining the rotated state;
if pulling the hinge support body (120) from the hinge rotation body (110) in a state that the hinge rotation body (110) and the hinge support body (120) are locked together, the locking of the locking member (118) is released; and
when the locking is released, the hinge rotation body (110) is unfolded from the hinge support body (120) so as to return the hinge rotation body (110) to its original position,
wherein the hinge rotation body (110) includes:
a connection member (112) having a bolt connection part (111) provided at a lower end thereof;
a rotary hinge member (114) that integrally extends from an upper end of the connection member (112) and is provided with a hinge shaft hole (113) at the inner center thereof; and
a locking member receiving part (116) that is provided on one surface of the rotary hinge member (114) and has support grooves (115) at opposing sides thereof,
wherein the locking member (118) is received in the locking member receiving part (116), locking member shafts (117) seated in the support grooves (115) are provided at both ends opposing sides of the locking member (118), and the locking member (118) is provided to implement seesaw movement in left and right directions by rotation about the locking member shafts, and
wherein the hinge support body (120) includes a first hinge support member (120*a*) and a second hinge support member (120*b*), which are positioned to face each other, bolt-coupled, and hinged to opposing sides of the rotary hinge member (114) in the hinge rotation body (110), respectively,
wherein the first hinge support member (120*a*) of the hinge support body (120) includes:
a locking ball receiving guide (124) which is provided inside the first rotary support part (121) and is formed of a long groove; and
a locking ball (125), which is received in the locking ball receiving guide (124), is moved to the locking member (118) having locking member shafts (117) provided at opposing sides thereof when the hinge rotation body (110) is hinge-rotated and folded toward the hinge support body (120), followed by pressing one side of the locking member (118) to lift the other side of the locking member (118) to thus allow locking, and which is moved toward the other side of the locking member (118) when the hinge rotation body (110) is further pushed toward the hinge support body (120) and further folded toward the hinge support body (120), followed by pressing the lifted other side of the locking member (118) to thus allow unlocking.

2. The hinge assembly according to claim 1, wherein the first hinge support member (120*a*) of the hinge support body (120) further includes:
a first rotary support part (121) which is in close contact with one surface of the rotary hinge member (114) in the hinge rotation body (110) and has a first rotary support hole (121*a*) positioned to correspond to one side of the hinge shaft hole (113);
a first hook (122) extending from an outer surface of the first rotary support part (121);
a first semi-helical part (123) which is provided at the end of the first hinge support member (120*a*) and is spirally-coupled to a support object; and
a locking jaw (126), in which, when the other side of the locking member (118) is lifted while pressing the one side thereof by the locking ball (125), the lifted other side of the locking member (118) is locked thereon, wherein the second hinge support member (120*b*) includes:

a second rotary support part (127) which is in close contact with the other surface of the rotary hinge member (114) in the hinge rotation body (110) and has a second rotary support hole (127*a*) positioned to correspond to the other side of the hinge shaft hole (113);

a second hook (128) extending from an outer surface of the second rotary support part (127) and being in close contact with the first hook (122) of the first hinge support member (120*b*); and a second semi-helical part (129) which is provided at the end of the second hinge support member (120*b*), is in close contact with the first semi-helical part (123), and is spirally-coupled to the support object, and wherein the hinge assembly further includes:

the hinge shaft hole of the hinge rotation body being coaxially aligned with the first rotary support hole of the first hinge support member (120*a*) and the second rotary support hole (127*a*) of the second hinge support member (120*b*); and a coupling bolt (140) to fasten and fix the first hinge support member (120*a*) and the second hinge support member (120*b*).

3. The hinge assembly according to claim 2, wherein, on a lower surface of the locking member (118), there is provided a seesaw guide surface (119) up-inclined toward an upper surface of the locking member (118) in both directions around the locking member shafts (117) provided at opposing sides of the locking member (118), so as to facilitate the seesaw movement of the locking member (118), and wherein there is provided a down-inclined movement guide surface (119*a*) at one side of the upper surface of the locking member (118) in order to facilitate movement of the locking ball (125) toward the locking member (118).

4. The hinge assembly according to claim 1, wherein, inside the second hinge support member (120*b*) of the hinge support body (120), there are provided a return body receiving part (151) and a return body fitting groove (152) extending toward an upper side of the return body receiving part (151), and a return body support protrusion (153) is provided at one side of the return body fitting groove (152), wherein there is provided an elastic return body (150), which is accommodated in the return body receiving part (151) and is in close contact with the other surface of the rotary hinge member (114) in the hinge rotation body (110), wherein one end (150*a*) of the elastic body (150) is fitted and hooked in the return body fitting groove (152), and then, the one end (150*a*) is supported by the return body support protrusion (153), and wherein a return body locking groove (154), on which the other end (150*b*) of the elastic return body (150) is locked, is provided on the other surface of the rotary hinge member (114) in the hinge rotation body (110).

* * * * *